(No Model.)
J. P. TURNER.
ONION CULTIVATOR.
No. 280,416. Patented July 3, 1883.
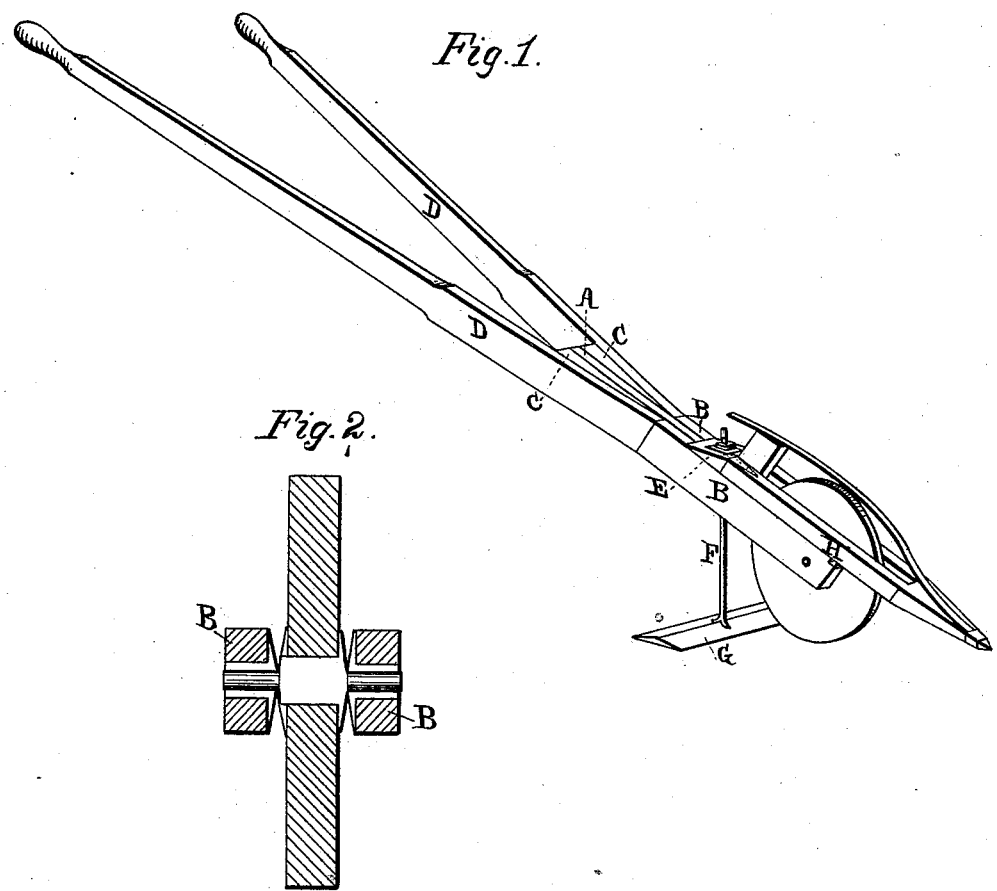
Witnesses.
B. W. Gartside
C. N. Lewis
Inventor.
James P. Turner

UNITED STATES PATENT OFFICE.

JAMES P. TURNER, OF DAVENPORT TOWNSHIP, SCOTT COUNTY, IOWA.

ONION-CULTIVATOR.

SPECIFICATION forming part of Letters Patent No. 280,416, dated July 3, 1883.

Application filed January 22, 1883. (No model.)

*To all whom it may concern:*

Be it known that I, JAMES P. TURNER, a citizen of the United States, residing in Davenport township, in the county of Scott and State of Iowa, have invented a new and useful Improvement in Hand-Cultivators; and I do hereby declare that the following is a full, clear, and exact description of the construction and operation of the same, reference being had to the accompanying drawings, and to the letters and figures of reference marked thereon.

My improvement is an attachment for hand-cultivators, whereby, when attached thereto, onions and other vegetables can be cultivated without injuring the tops, as will be hereinafter explained.

In the accompanying drawings, Figure 1 is a representation of my improvement attached to a hand-cultivator. Fig. 2 is a sectional view of the wheel and axle that supports the front end of the cultivator.

The cultivator that I introduce to represent the operation and utility of my invention consists of a center piece, A, and two side pieces, B B, which form an opening in front for the wheel. The two beveled pieces C C give the two handles D D the desired width. Blade G is secured to rod F, and can be raised or lowered by the manipulation of two nuts on rod F. One rests on beveled piece E. The other rests on a beveled washer on the under side of center piece, A.

H represents my improvement. Its construction and connection to the above-described cultivator are fully shown in the drawings. The two side pieces of the attachment unite at the front and are beveled to a point. They rest on the two side pieces, B B, and are secured to the cultivator by two hinges, that rest on piece E. One end of the half-round hoop that extends over the wheel is made fast under an iron tip that covers the front point of the attachment. The other end is made fast to a small piece of hard wood that is made fast between the rear ends of the two side pieces of the attachment.

The cultivator is worked by being pushed forward. If the point of the attachment is too low, it can be raised by turning two nuts on threaded bolts that are made fast to the two side pieces of the attachment and extend down through the two side pieces, B B, just in front of the axle. The two nuts rest in a small opening at the top of the two side pieces, B B, as shown in the drawings. As the attachment is only made fast to the cultivator by two hinges, the point will rise when it strikes an elevation in the ground. When the machine is used the point of the attachment touches the ground, works its way under the tops, carries them over the wheel and past the tops of rod F, clearing an opening for the wheel-rod F, and also for the person working the machine.

What I claim as new, and desire to secure by Letters Patent, is—

In a hand-plow, the combination, with the frame, the wheel, and the cutter, of attachment H, having hoop K, substantially as shown and described.

JAMES PETER TURNER.

Witnesses:
J. BEHRENS,
F. H. BRAINARD.